Figure 1:
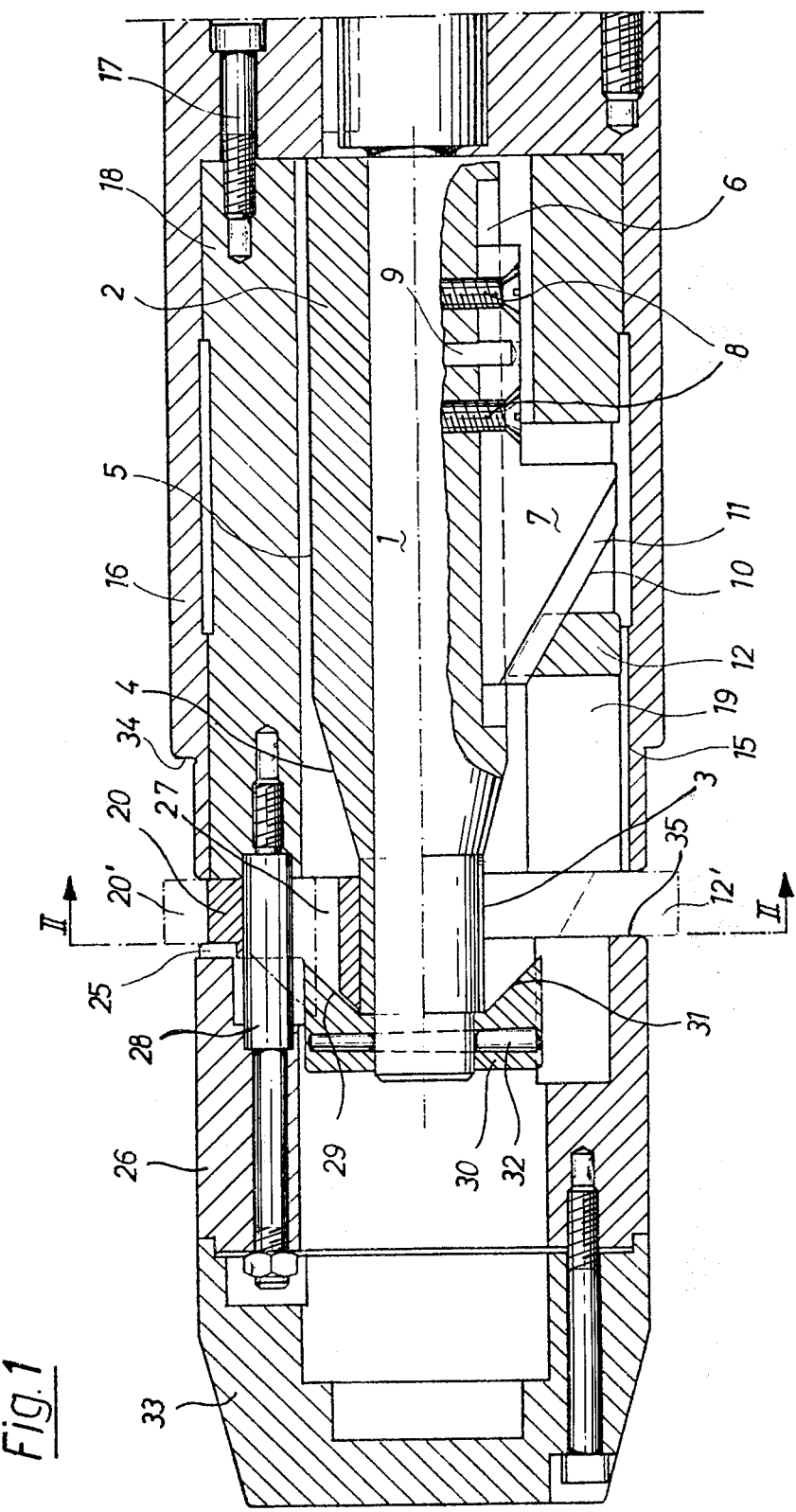

United States Patent [19]
Strasser

[11] 3,940,227
[45] Feb. 24, 1976

[54] EXPANSIBLE MANDREL

[76] Inventor: Georg J. Strasser, Schutzengutli 19, CH-9220 Bischofszell, Switzerland

[22] Filed: June 20, 1974

[21] Appl. No.: 481,396

[52] U.S. Cl. ............... 425/392; 425/403; 249/180; 249/184
[51] Int. Cl.² .................. B29C 17/00; B29D 23/00
[58] Field of Search ...... 425/342, 393, DIG. 5, 403; 249/175, 178, 179, 180, 184, 186, 59

[56] References Cited
UNITED STATES PATENTS

| | | | |
|---|---|---|---|
| 2,315,634 | 4/1943 | McCall | 249/179 |
| 2,507,924 | 5/1950 | Morse | 249/180 |
| 3,339,242 | 9/1967 | Lamb | 249/180 X |
| 3,482,815 | 12/1969 | Naturale | 249/180 |
| 3,677,684 | 7/1972 | Platz | 425/393 |
| 3,704,978 | 12/1972 | Leier et al. | 425/393 |
| 3,749,543 | 7/1973 | Stansbury | 425/393 |

Primary Examiner—J. Howard Flint, Jr.
Attorney, Agent, or Firm—Edmund M. Jaskiewicz

[57] ABSTRACT

In an expansible core, a plurality of first plate segments are moved radially outwardly by means of a conical portion on an operating rod which is moved axially along the longitudinal axis of the core. A plurality of second plate segments are moved axially by the operating rod into the plane of the first plate segments and then expanded outwardly into the spaces between the first plate segments. First and second retraction means are also provided on the operating rod and are engageable respectively with the first and second plate segments to retract the plate segments from their expanded positions upon axial movement of the operating rod in the other direction.

3 Claims, 2 Drawing Figures

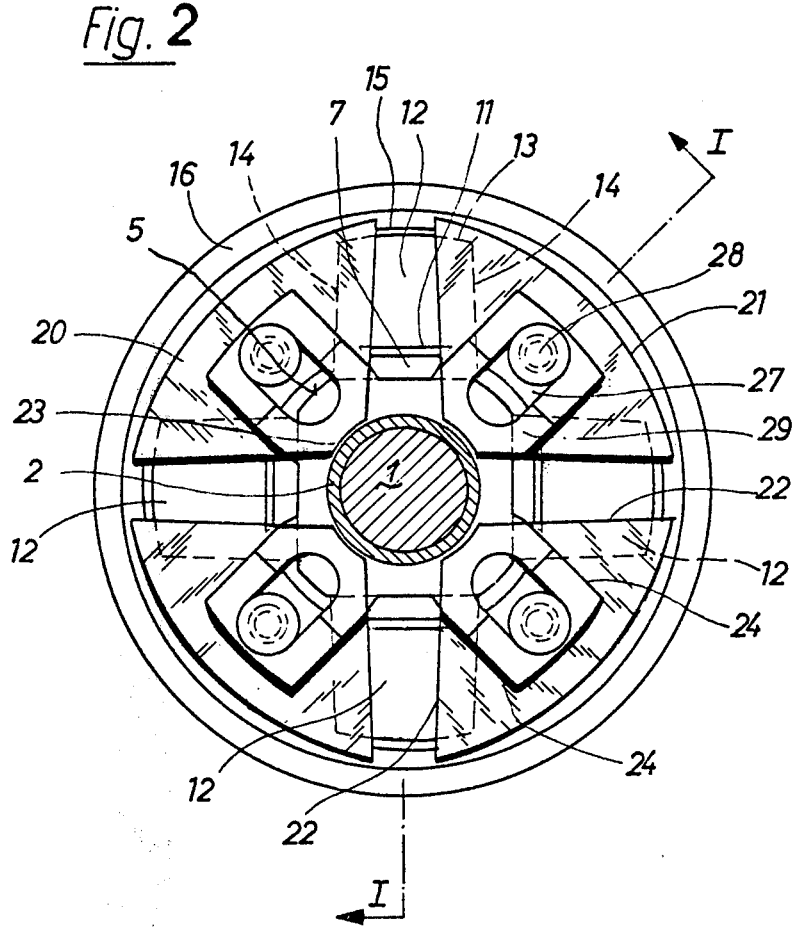

EXPANSIBLE MANDREL

The present invention relates to an expansible core of the type wherein a plurality of plate segments are expanded such that their peripheral surfaces define the surface of the core, more particularly, to the structure for expanding and retracting the plate segments.

Expansible cores have been utilized in order to form internal annular grooves in pipes or tubes made of synthetic plastic materials. When such synthetic plastic pipes are used to convey fluids or liquids under pressure the annular grooves must be precisely formed in order to receive closely packing or sealing rings. If the packing rings fit loosely or imperfectly in the annular grooves leakage is likely to occur when fluids under pressure are conveyed through the pipes.

Such internal annular grooves are formed by various processes but essentially the grooves are formed when the synthetic plastic material has been heated to thermo elasticity so that the plastic can be formed or molded into the desired configuration of the annular groove.

Various processes and apparatus have been proposed for the formation of such internal grooves in plastic pipe. One general category of such processes utilizes the deforming force of a controlled fluid using either pressure or suction forces. According to these processes, the synthetic plastic material of the pipe is generally heated and then forced radially outwardly or inwardly into a mold. Such processes are generally disadvantageous in that the annular groove produced has relatively large radii at the transitions so that it is not possible to obtain an ideal fit or seat for the packing ring intended to be inserted into the groove. It is also noted that in such processes fixed outer dies are positioned around the pipe. During the expansion of the pipe wall to form the groove the wall of the pipe will be forced against the outer die. However, as a practical matter the initial wall thickness of pipes is rarely uniform and the result is that there are variations in the internal diameters of the annular grooves. This variation in the diameters of the annular grooves contributes to a poor fit for the packing ring or seal.

It is therefore a principal object of the present invention to provide a novel and improved apparatus for the precise and accurate forming of annular grooves in the walls of synthetic plastic pipe.

It is another object of the present invention to provide an expansible core wherein the expansible portions which shape the groove in the wall of the tube are precisely and accurately controlled so that accurate and uniform grooves can be produced.

According to one aspect of the present invention there is provided an expansible core which may comprise first and second plate segments which are radially movable between expanded and retracted positions. An operating rod is axially reciprocable along the longitudinal axis of the core. First and second expansion means are provided on the rod and are operatively engageable with the first and second plate segments respectively for expanding the segments radially outwardly. First and second retraction means are axially spaced on the rod and are also engageable with the first and second plate segments for retracting these segments respectively.

Employing the apparatus of the present invention, expanding a core consisting of a plurality of plate segments whose peripheral surfaces define the surface of the core may comprise the steps of displacing radially outwardly a plurality of first plate segments into an expanded position wherein the plate segments are spaced from each other. A plurality of second plate segments are displaced axially into the plane of the first plate segments. The second plate segments are then displaced radially outwardly in the plane of the first plate segments into the spaces between the expanded first plate segments such that the expanded first and second plate segments define a continuous peripheral surface.

Other objects and advantages of the present invention will be apparent upon reference to the accompanying description when taken in conjunction with the following drawings, which are exemplary, wherein;

FIG. 1 is a longitudinal sectional view of an expansible core according to the present invention; and FIG. 2 is a sectional view taken along the line I—II of FIG. 1.

Proceeding next to the drawings wherein like reference symbols indicate the same parts throughout the various views a specific embodiment and modifications of the present invention will be described in detail.

The expansible core of the present invention as shown in FIGS. 1 and 2 is provided with an operating rod 1 which is positioned along the central longitudinal axis of the core. A sleeve 2 is mounted upon the rod 1 in such a manner so as to be secured against rotation and secured against any axial displacement. The rod 1 together with the sleeve 2 can be reciprocated by means of a cylinder-piston unit (not shown in the drawings but known in the art), for the purpose of expanding and retracting the expansible core in a manner to be presently described.

The sleeve 2 is provided at one end thereof with a smaller diameter cylindrical portion 3, a conical portion 4 which interconnects smaller diameter portion 3 with a larger diameter cylindrical portion 5. Four longitudinal grooves 6 spaced 90° apart are formed in the cylindrical portion 5 of sleeve 2. A corresponding number of wedge-shaped or cam members 7 are seated within the groove 6 and are secured therein by means of screws 8. A pin 9 attaches the sleeve 2 to the rod 1.

Each wedge-shaped member 7 is provided with an inclined surface 10 which comprises a dove-tail guide 11. The wedge-shaped members function as expansion members as will be presently described.

A plate segment 12 is positively guided upon each dove-tail guide 13 by means of a correspondingly shaped groove. These plate segments may be generally referred to as the second plate segments. Each plate segment 12 has a definite thickness as can be seen in FIG. 1, a curved peripheral surface 13 and two lateral surfaces 14 which diverge inwardly from the peripheral surface 13 as can be seen in FIG. 13. Generally speaking, each of the second plate segments 12 is cuboid in shape.

In the positions of the plate segments 12 as shown in FIG. 1 the segments are each spaced a small radial distance from the inner wall surface 15 of a sleeve 16. The sleeve 16 is connected by screw 17 to a tubular casing 18. The casing 18 is provided with four longitudinally extending grooves 19 uniformly spaced around its periphery such that the wedge-shaped members 7 slide longitudinally in the grooves 19.

Four first plate segments 20 in their retracted positions rest upon the cylindrical portion 3 of sleeve 2 and are uniformly spaced around the periphery thereof. The plate segments 20 are sector-shaped as can be seen in FIG. 2 and each defines an angle of about 90°–95° between its lateral surfaces 22. Each segment 20 also has an outer curved peripheral surface 21 and an inner curved surface 23 whose radius of curvature is substantially that of the radius of curvature of the cylindrical portion 5.

The lateral surfaces 22 of segments 20 are positioned approximately in parallel with the lateral surfaces 14 of the second segments 12 which are positioned behind the first segments 20 in an axial direction as can be seen in the drawings.

Each first segment 20 has two front surfaces 24 which are received in recesses 25 in a sleeve 26. The surfaces 24 are on the face of the segment 20 that is seen directly in view of FIG. 2. In this manner, the segments 20 are thus guided for movement in both the radial and axial directions and can be displaced by means of the guide surface 24 only radially, inwardly or outwardly. Each segment 20 is provided between its front guide surfaces 24 with a slot 27 through which extends a pin 28. The pin 28 passes also through sleeve 26 and is threaded into the casing 18. Each segment 20 is also provided with a forward or leading inclined surface 29.

On the left end of rod 1 as seen in FIG. 1, a jaw-shaped ring 30 is mounted by means of a pin 32 upon the rod 1. The ring 30 is provided with four inclined guide surfaces 31 which correspond with the inclined surfaces 29 of the segments 20. When the operating rod 1 is retracted or moved to the right as seen in FIG. 1, the rod guide surfaces 31 will cam the segment guide surface 29 to retract the segments 20 radially inwardly and to retain the segments 20 in their retracted positions as shown in FIG. 1.

The expansible core is also provided with a receiving cone 33 which facilitates the sliding of a synthetic plastic pipe or tube upon the mandrel. This pipe or tube within which a groove is to be formed is moved upon the mandrel until the end of the tube abuts shoulder 34 on sleeve 16.

In FIG. 1, the operating rod 1 is shown in its right-hand or retracted position wherein the expansible core is ready for receiving a tube in which a groove is to be formed. In this position, the second plate segments 12 are shown in their retracted positions which is in a plane axially spaced from the plane of the first plate segments 20 which later plane is perpendicular in FIG. 1. It is to be noted that the plate segments 20 are displacable only in a radial direction while the second plate segments 12 are displacable both axially and radially. The axial movement of the second plate segments 12 occurs when the operating rod and thus the wedge-shaped member 7 is moved axially toward the left as viewed in FIG. 1. The plate segments 12 can be displaced radially outside of sleeve 16 in the plane of the first plate segments 20 only when the segments 12 are moved axially so as to contact face 34 on sleeve 26. When the segments 12 are abutting the face 35 further axial movement of the rod 1 toward the left will cause the inclined surface 10 of wedge member 7 to cam the plate segments 12 radially outwardly.

Upon sliding a plastic pipe within which a groove is to be formed upon the expansible core of FIG. 1, the operating rod 1 is shifted toward the left as seen in FIG. 1. As soon as the conical portion 4 contacts the plate segments 20, these segments are displaced radially outwardly since they become disengaged from the inclined surfaces 31 on the retaining ring 30. Upon continued displacement of the rod 1 toward the left as seen in FIG. 1, the plate segments 12 are moved axially into the plane of plate segments 20 at which point they contact the face 35. Additional displacement of rod 1 will cause the inclined surfaces 10 of wedges 7 to cam the plate segments 12 radially outwardly until they reach their expanded position in which their lateral surfaces 14 are in contact with the lateral surfaces 22 of the plate segments 20. When the plate segments 20 are expanded outwardly spaces remain between these segments and the plate segments 12 are moved radially outwardly into the spaces. The expanded position of the segments 20 is indicated at 20' by dash lines in FIG. 1. Similarly, the expanded position of the segments 12 is shown in FIG. 1 by the dash lines 12'. In the expanded positions, the peripheral surfaces 13 of segments 12 and the peripheral surfaces 21 of segments 20 now form together a continuous peripheral surface of a plate which has the thickness of segments 12 or 20. These segments are the same in thickness.

In a manner known in the art, that portion of the tube in which the groove is to be formed is heated to thermo elasticity such that the radial outward movement of segments 12 and 20 form the groove in the heated region of the plastic pipe. A mold which may comprise two-piece dies and not shown in the drawing is also provided outside the expansible core in the plane of the segments 20 to shape the outer surface of the groove.

After the groove has been molded in the plastic pipe, the segments 20 and 12 must now be retracted radially inwardly. The fitting of the dove-tail guide 11 of wedge element 7 within a correspondingly shaped groove formed in the plate segment 12 would bring about a retraction of the plate segments 12 as the operating rod 1 is retracted or moved to the right as shown in FIG. 1. Since in its radially expanded position 12', each segment 12 is positioned against axial displacement because of its contact with the ends of the sleeves 16 and 26, the displacement of the rod 1 to the right will necessarily bring about the radially inward displacement of segments 12. Thus the segments 12 are retracted from their expanded positions 12' into the interior of sleeve 16 and are then displaced axially into the position shown in FIG. 1 upon further movement to the right by the rod 1. It is only when the segments 12 have been retracted from their expanded positions 12' and then displaced axially into the interior of sleeve 16 so that the segments 12 are outside of the plane of segments 20 will be inclined surfaces 29 of segments 20 engage the inclined surfaces 31 of ring 30. This engagement of inclined surfaces 31 and 29 will bring about a radially inward displacement of plate segments 20. The expansible core is now in its original or starting position as shown in FIG. 1 and is ready to receive a further synthetic resin pipe into which a groove is to be expanded.

In the embodiment of the expansible core as disclosed herein the segments 12 and 20 are constructed as circular segments such that in their expanded positions the segments 12 and 20 form a continuous circular surface so as to form a circular annular groove. However, the process for producing this expansible core according to the present invention can also be applied to the forming of an annular groove that is not circular in shape. In such a modification, the curved peripheral surfaces 13 and 21 of segments 12 and 20 would no longer be segments of a circle.

Thus it is apparent that the present invention has disclosed an expansible core which is simple in construction but reliable in operation when employed in the formation of an annular groove in a plastic pipe or tube. In effect, the groove is formed by means of a circular plate being forced against the inner surface of the plastic tube. This circular plate is formed by first segments which move only radially and of second segments which are moved axially into the plane of the first segments and then moved radially outwardly between the first segments. As a result of the present invention, precise and accurate annular grooves can be formed to insure the accurate seating of packing and sealing rings therein.

It will be understood that this invention is susceptible to modification in order to adapt it to different usages and conditions, and accordingly, it is desired to comprehend such modifications within this invention as may fall within the scope of the appended claims.

I claim:

1. An expansion mandrel for forming an internal annular groove in a tubular element of a synthetic plastic material comprising first and second groups of plate segments being positionable alternately in side-by-side relation in the expanded position, said first plate segments being larger than said second plate segments, means on said mandrel for mounting said first group of plate segments for movement inwardly and outwardly in a radial plane of the mandrel, an operating rod axially reciprocable along the longitudinal axis of the mandrel, a conical portion on said rod engageable with said first plate segments to cam said first segments radially outwardly into the expanded position upon axial movement of said rod in a first direction, a plurality of wedge-shaped elements on said rod subsequent to said conical portion with respect to said first direction of movement and having inclined surfaces thereon with dove-tail guides therein slidably engaging said second segments, said second plate segments being movable axially and then radially, and stop means on said mandrel for stopping the axial movement of said second segments in the said radial plane of said first segments so that axial movement of said rod in said first direction will cam said second segments radially outwardly into the expanded position in alternate side-by-side relation with said first segments.

2. In an expansible core as claimed in claim 1 wherein there are four first plate segments and four second plate segments all of which in their expanded positions define a circular surface, each of said first plate segments defining an angle of 90°–95°.

3. In an expansible core as claimed in claim 1 wherein said second plate segments each are substantially cuboid in shape and each outer surface thereof is a segment of a cylinder, the lateral surfaces of each second plate segment diverging inwardly from its outer surface.

* * * * *